US010586122B1

(12) United States Patent (10) Patent No.: US 10,586,122 B1
Gingrich et al. (45) Date of Patent: Mar. 10, 2020

(54) SYSTEMS AND METHODS FOR DETERMINING LIKELIHOOD OF TRAFFIC INCIDENT INFORMATION

(71) Applicant: UIPCO, LLC, San Antonio, TX (US)

(72) Inventors: Jess W. Gingrich, San Antonio, TX (US); Manfred Amann, San Antonio, TX (US); Eric David Schroeder, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 73 days.

(21) Appl. No.: 15/792,419

(22) Filed: Oct. 24, 2017

Related U.S. Application Data

(60) Provisional application No. 62/415,115, filed on Oct. 31, 2016.

(51) Int. Cl.
| | |
|---|---|
| *G06K 9/00* | (2006.01) |
| *G06T 7/20* | (2017.01) |
| *G06K 9/62* | (2006.01) |
| *B60R 21/00* | (2006.01) |
| *H04L 29/08* | (2006.01) |

(52) U.S. Cl.
CPC ..... *G06K 9/00832* (2013.01); *G06K 9/00335* (2013.01); *G06K 9/6277* (2013.01); *G06T 7/20* (2013.01); *B60R 2021/003* (2013.01); *B60R 2021/0027* (2013.01); *G06T 2207/30248* (2013.01); *H04L 67/12* (2013.01)

(58) Field of Classification Search
CPC ........... G06K 9/00832; G06K 9/00335; G06K 9/6277; G06T 7/20; G06T 2207/30248; B60R 2021/0027; B60R 2021/003
See application file for complete search history.

(56) References Cited

U.S. PATENT DOCUMENTS

| | | | | |
|---|---|---|---|---|
| 9,996,757 | B1* | 6/2018 | Chan | G06K 9/00845 |
| 10,140,533 | B1* | 11/2018 | Chan | G06K 9/00845 |
| 2006/0251293 | A1* | 11/2006 | Piirainen | B60N 2/002 |
| | | | | 382/104 |
| 2013/0141520 | A1* | 6/2013 | Zhang | G06K 9/4638 |
| | | | | 348/36 |
| 2015/0149218 | A1* | 5/2015 | Bayley | G06Q 40/04 |
| | | | | 705/4 |
| 2016/0023665 | A1* | 1/2016 | Sherony | B60W 50/12 |
| | | | | 701/2 |
| 2018/0033220 | A1* | 2/2018 | Pal | H04W 4/029 |

* cited by examiner

*Primary Examiner* — Brenda C Bernardi
(74) *Attorney, Agent, or Firm* — Fletcher Yoder, P.C.

(57) ABSTRACT

A method includes receiving a first set of images from an image capture device of a vehicle. The method also includes performing a first analysis of movement of biomechanical points of occupants of the vehicle in the first set of images. The method further includes receiving an indication that a traffic incident has occurred. The method also includes receiving a second set of images from the image capture device corresponding to when the traffic incident occurred. The method further includes performing a second analysis of movement of the biomechanical points of the occupants in the second set of images. The method also includes determining a likelihood of injury or a severity of injury to the occupants based on the first analysis of movement and the second analysis of movement.

20 Claims, 3 Drawing Sheets

SYSTEMS AND METHODS FOR DETERMINING LIKELIHOOD OF TRAFFIC INCIDENT INFORMATION

CROSS REFERENCE TO RELATED APPLICATION

This application claims priority to and benefit from U.S. Provisional Application No. 62/415,115 filed Oct. 31, 2016, and incorporates the entirety of the same by reference herein.

BACKGROUND

The present disclosure relates generally to traffic incidents, and more particularly to systems and methods for determining a likelihood and/or a severity of the traffic incidents by using an image capture device.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

With the advent of lower cost, more accessible image capture devices (e.g., vehicle-mounted cameras, smartphones, and the like) and widespread communication networks (e.g., mobile networks, the Internet, and the like), capturing image data and communicating information based on the image data when operating a vehicle is easier than ever. If the vehicle is involved in a traffic incident, capturing images related to the traffic incident data may be particularly useful to emergency services, insurance companies, law enforcement agencies, and the like.

SUMMARY

In one embodiment, a data acquisition system for use in a vehicle includes an image capture device, a communication interface, and, a controller. The controller is communicatively coupled to the image capture device and communicatively coupled to the communication interface. The controller includes processors that receive a first set of images from the image capture device. The processors also identify biomechanical points of occupants in the vehicle in the first set of images. The processors further perform a first analysis of movement of the biomechanical points of the occupants in the first set of images. The processors also receive an indication that a traffic incident has occurred. The processors further receive a second set of images from the image capture device corresponding to when the traffic incident occurred. The processors also identify the biomechanical points of the occupants in the vehicle in the second set of images. The processors further perform a second analysis of movement of the biomechanical points of the occupants in the second set of images. The processors also determine a likelihood of injury or a severity of injury to the occupants based on the first analysis of movement and the second analysis of movement. The processors further send an alert, via the communication interface, based on the likelihood or the severity of injury to the occupants.

In another embodiment, a method includes receiving a first set of images from an image capture device of a vehicle. The method also includes performing a first analysis of movement of biomechanical points of occupants of the vehicle in the first set of images. The method further includes receiving an indication that a traffic incident has occurred. The method also includes receiving a second set of images from the image capture device corresponding to when the traffic incident occurred. The method further includes performing a second analysis of movement of the biomechanical points of the occupants in the second set of images. The method also includes determining a likelihood of injury or a severity of injury to the occupants based on the first analysis of movement and the second analysis of movement.

In yet another embodiment, tangible, non-transitory, machine-readable media include instructions that cause processors to perform a first analysis of movement of biomechanical points of occupants of a vehicle in a first set of images. The instructions also cause the processors to perform a second analysis of movement of the biomechanical points of the occupants in a second set of images. The instructions further cause the processors to determine a likelihood of injury or a severity of injury to the occupants based on the first analysis of movement and the second analysis of movement. The instructions also cause the processors to send an instruction to alert an emergency service, an insurance company, or a law enforcement agency, via the communication interface, based on the likelihood or the severity of injury to the occupants.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to traffic incidents, and more particularly to systems and methods for determining a likelihood and/or a severity of the traffic incident by using an image capture device. A data acquisition system may include the image capture device, which may be a vehicle-mounted camera (e.g., dashboard camera or action camera), an electronic device (e.g., a smartphone or laptop) that may be separate from a vehicle that includes an image capture device (e.g., an integrated camera), and the like. A controller of the data acquisition system may analyze movement of biomechanical points of one or more occupants of a vehicle in sets of images provided by the image capture device before, during, and/or after the traffic incident. The controller may also receive vehicle movement information (e.g., speed of the vehicle) from one or more sensors of the vehicle. The controller may then determine the likelihood and/or the severity of injury to the one or more occupants based on the analysis and/or the vehicle movement information. The controller may then send an instruction to alert an emergency service and/or an insurance company based on the likelihood and/or the severity of injury to the one or more occupants.

Figure 1:
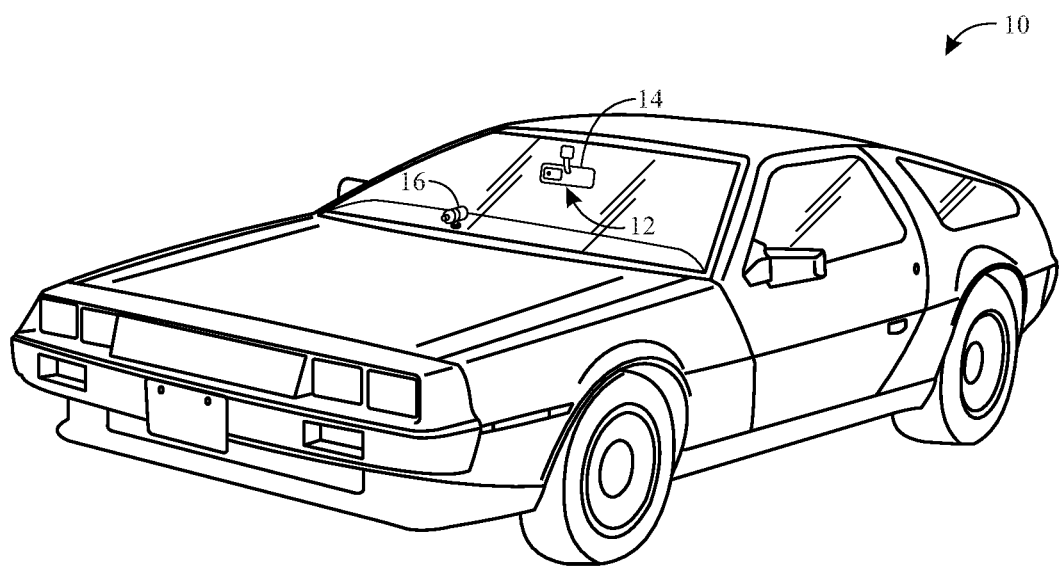
FIG. 1 is a perspective view of a vehicle that includes a data acquisition system in accordance with an embodiment of the present disclosure.

With the foregoing in mind, FIG. 1 is a perspective view of a vehicle 10 that includes a data acquisition system 12 in accordance with an embodiment of the present disclosure. While the vehicle 10 is illustrated as an automobile, it should be understood that the present disclosure applies to any suitable vehicle, such as a truck, motorcycle, commercial vehicle, recreational vehicle, all-terrain vehicle, boat, airplane, snowmobile, and the like. As illustrated, the data acquisition system 12 is mounted to the vehicle 10 via a rearview mirror 14 of the vehicle 10. In some embodiments, the data acquisition system 12 or components of the data acquisition system 12 may be mounted any suitable portion of the vehicle 10. For example, an image capture device of the data acquisition system 12 may include a dashboard camera 16. It should be noted that an image capture device includes any suitable device that captures images, including, for example, a video capture device. In some embodiments, the data acquisition system 12 or components of the data acquisition system 12 may be mounted to the exterior of the vehicle 10 or separate from the vehicle 10. For example, a controller, communication interface, sensor, and/or the image capture device of the data acquisition system 12 may be part of any suitable computing device in the vehicle 10, such as a mobile electronic device of an occupant of the vehicle 10, including, and without limitation, a smartphone, laptop, wearable device, and the like.

Figure 2:
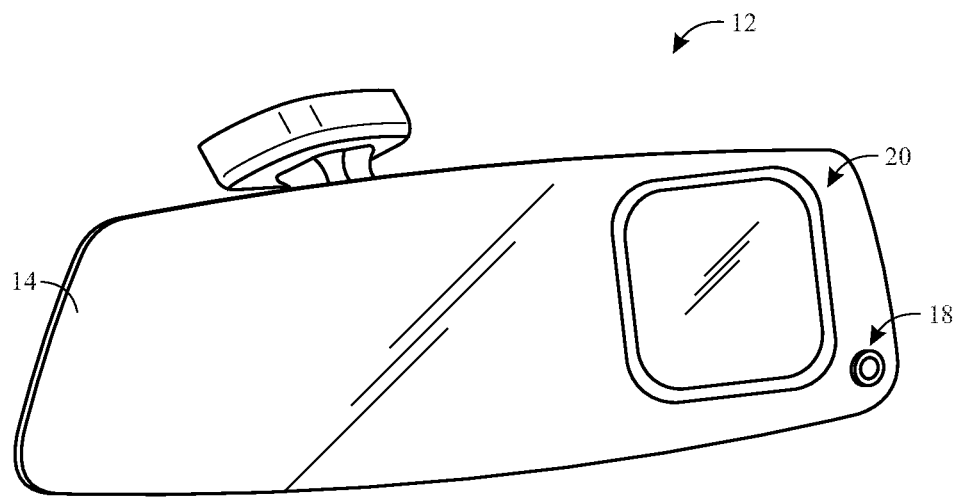
FIG. 2 is a first perspective view of the data acquisition system of FIG. 1 as viewed from inside the vehicle, in accordance with an embodiment of the present disclosure.

FIG. 2 is a first perspective view of a data acquisition system 12 of FIG. 1 as viewed from inside the vehicle 10, in accordance with an embodiment of the present disclosure. As illustrated, the data acquisition system 12 is integrated in the rearview mirror 14 of the vehicle 10. In some embodiments, the data acquisition system 12 may replace the rearview mirror 14. The data acquisition system 12 includes a rear-facing image capture device 18. The image capture device 18 may function at any suitable frame rate, including any frame rate between 20 and 100 frames per second (fps), such as 23.976 fps, 23.98 fps, 24 fps, 25 fps, 29.97 fps, 30 fps, 50 fps, 59.94 fps, 60 fps, and the like. As illustrated, the data acquisition system 12 also includes a visual display 20 that may provide a video feed of the images captured by the image capture device 18.

Figure 3:
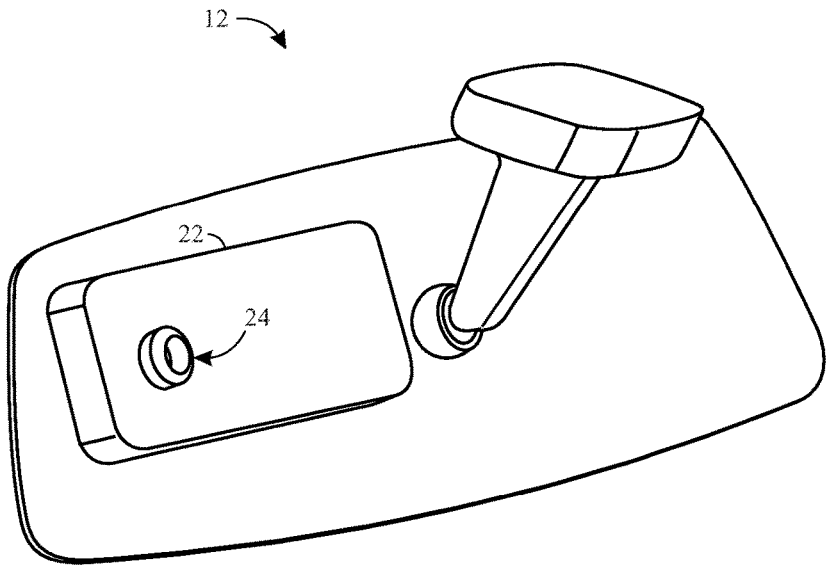
FIG. 3 is a second perspective view of the data acquisition system of FIG. 1 as viewed from the front of the vehicle, in accordance with an embodiment of the present disclosure.

FIG. 3 is a second perspective view of the data acquisition system 12 of FIG. 1 as viewed from the front of the vehicle 10, in accordance with an embodiment of the present disclosure. As illustrated, the data acquisition system 12 includes a housing 22 that may house components of the data acquisition system 12, such as a controller, a communications interface, and the like. The data acquisition system 12 may include a front-facing image capture device 24 that may be used to capture images of other vehicles, road conditions, weather conditions, traffic signals and signs, and other information that may relate to operating the vehicle 10.

Figure 4:
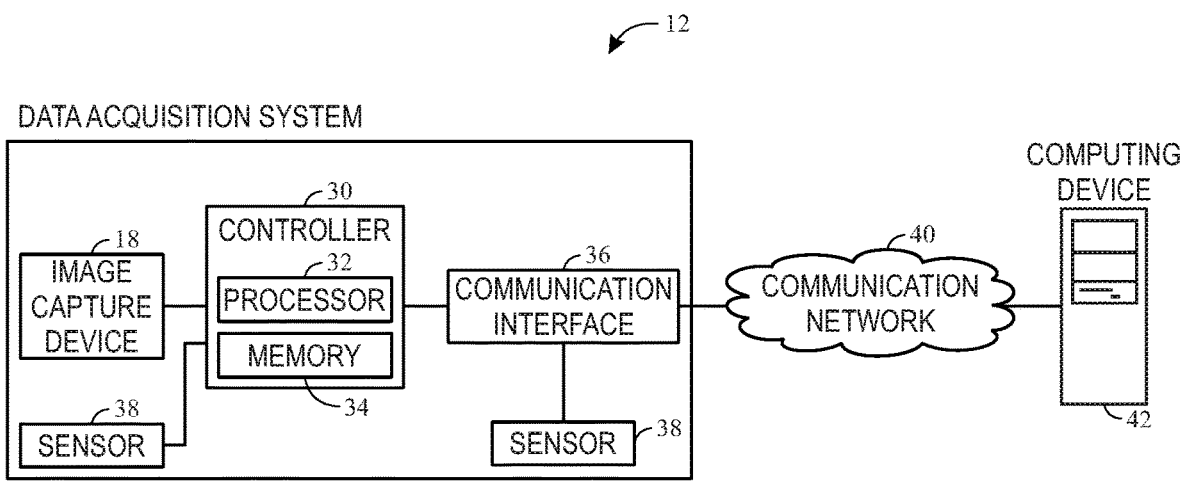
FIG. 4 is a block diagram of the data acquisition system of FIG. 1, in accordance with an embodiment of the present disclosure.

FIG. 4 is a block diagram of the data acquisition system 12 of FIG. 1, in accordance with an embodiment of the present disclosure. The data acquisition system 12 includes a controller 30 that includes one or more processors 32 and one or more memory devices 34. The one or more processors 32 (e.g., microprocessors) may execute software programs and/or instructions to determine a likelihood and/or a severity of injury to one or more occupants of the vehicle 10, contents of the vehicle 10, or aspects of the vehicle 10 itself. Moreover, the one or more processors 32 may include multiple microprocessors, one or more "general-purpose" microprocessors, one or more special-purpose microprocessors, and/or one or more application specific integrated circuits (ASICS), or some combination thereof. For example, the one or more processors 32 may include one or more reduced instruction set (RISC) processors. The one or more memory devices 34 may store information such as control software, look up tables, configuration data, etc. In some embodiments, the one or more processors 32 and/or the one or more memory devices 34 may be external to the controller 18. The one or more memory devices 34 may include a tangible, non-transitory, machine-readable-medium, such as a volatile memory (e.g., a random access memory (RAM)) and/or a nonvolatile memory (e.g., a read-only memory (ROM)). The one or more memory devices 34 may store a variety of information and may be used for various purposes. For example, the one or more memory devices 34 may store machine-readable and/or processor-executable instructions (e.g., firmware or software) for the one or more processors 32 to execute, such as instructions for determining the likelihood and/or the severity of injury to one or more occupants of the vehicle 10. The one or more memory devices 34 may include one or more storage devices (e.g., nonvolatile storage devices) that may include read-only memory (ROM), flash memory, a hard drive, or any other suitable optical, magnetic, or solid-state storage medium, or a combination thereof.

As illustrated, the image capture device 18 is communicatively coupled to the controller 30. As such, images (or videos) captured by the image capture device 18 may be sent to the controller 30 for storage (e.g., in the one or more memory devices 34), analysis (e.g., by the one or more processors 32), forwarding (e.g., via one or more communication interfaces 36), or any other suitable purpose.

One or more sensors 38 may also be communicatively coupled to the controller 30. The one or more sensors 38 may sense information related to operating the vehicle 10. For example, the one or more sensors 38 may include a vehicle speed sensor, a vehicle acceleration sensor, a vehicle location sensor, a vehicle wheel speed sensor, and/or any other suitable sensor related to operating the vehicle 10. As illustrated, in some embodiments, the one or more sensors 38 may be communicatively coupled to the controller 30 via the one or more communication interfaces 36. For example, a vehicle sensor 38 of the vehicle 10 may be communicatively coupled to a vehicle bus (e.g., controller area network (CAN) bus) of the vehicle 10, which may communicate with the one or more communication interfaces 36, which is communicatively coupled to the controller 30. In this manner, the controller 30 may receive information from the vehicle sensor 38 of the vehicle 10.

The data acquisition system 12 also includes the one or more communication interfaces 36. The one or more communication interfaces 36 may enable the controller 30 to communicate with any suitable communication network 40. For example, as discussed above, a communication interface 36 may enable the controller 30 to communicate with a vehicle bus of the vehicle 10. The one or more communication interfaces 36 may also enable the data acquisition system 12 to communicate with additional communication networks 40. For example, a communication interface 36 may enable the controller 30 to communicate with wireless networks (e.g., mobile, WiFi, LAN, WAN, Internet, and the like). In this manner, the one or more communication interfaces 36 may enable the controller 30 to communicate with computing devices 42 of emergency services, insurance companies, law enforcement agencies, and the like, to provide alerts related to the likelihood and/or the severity of injury to one or more occupants of the vehicle 10.

In some embodiments, the data acquisition system 12 may not be contained in a single electronic device, but may be components of multiple electronic devices. For example, the image capture device 18 may be a dashboard-mounted video camera, the one or more sensors 38 may be part of the vehicle 10, and the controller 30 and the communication interface 36 may be part of a smartphone that belongs to an occupant of the vehicle 10. The controller 30 may communicate with the image capture device 18 and the one or more sensors 38 via the communication interface 36 of the smartphone and communication interfaces 36 of the image capture device 18 and the vehicle 10.

Figure 5:
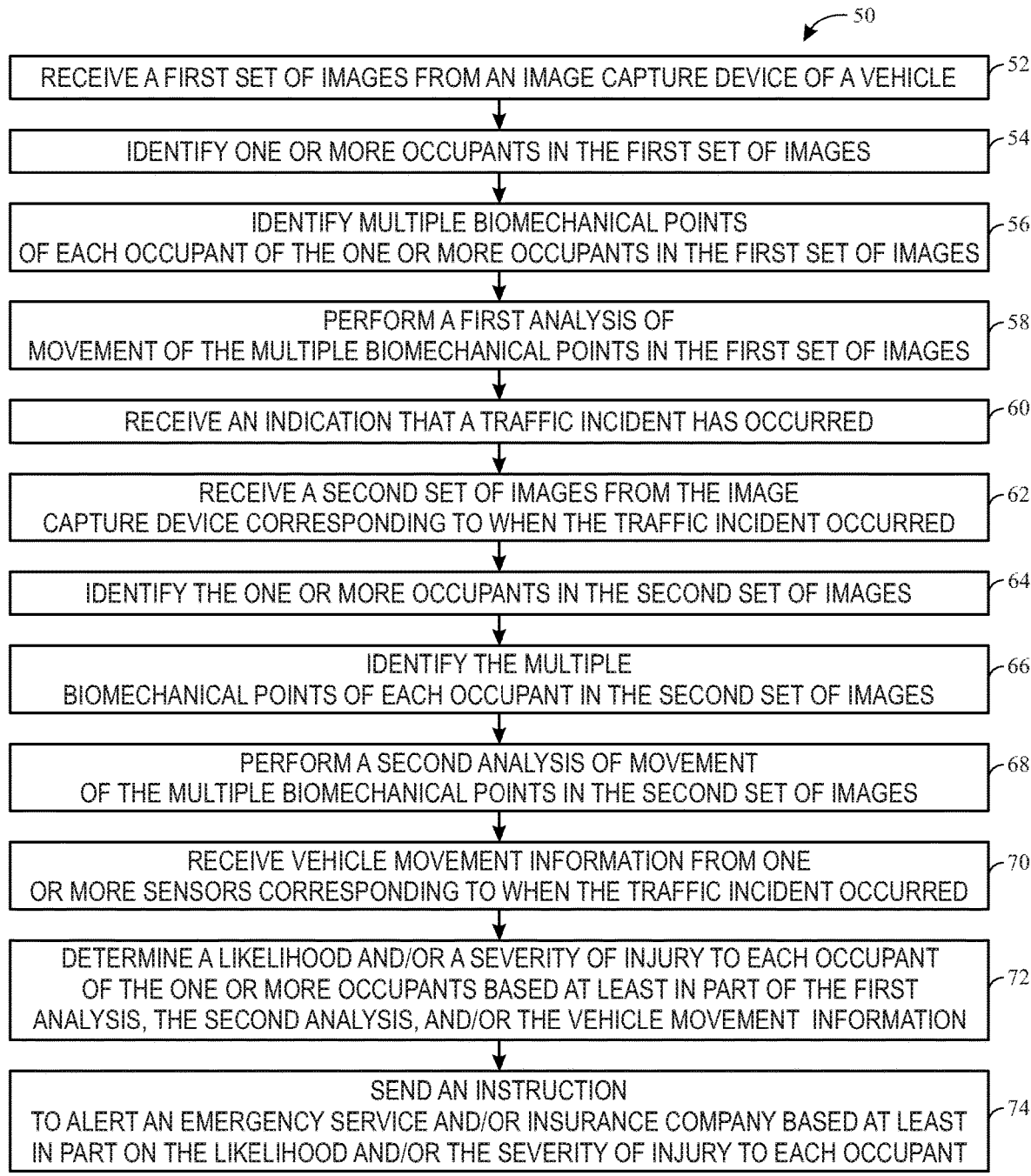
FIG. 5 is a flowchart illustrating a method for determining a likelihood of a traffic incident and/or a severity of the traffic incident, in accordance with an embodiment of the present disclosure.

FIG. 5 is a flowchart illustrating a method 50 for determining a likelihood and/or a severity of a traffic incident injury, in accordance with an embodiment of the present disclosure. The method 50 may be performed by any suitable device that may control components of the data acquisition system 12, such as the controller 30. While the method 50 is described using steps in a specific sequence, it should be understood that the present disclosure contemplates that the described steps may be performed in different sequences than the sequence illustrated, and certain described steps may be skipped or not performed altogether. In some embodiments, the method 50 may be implemented by executing instructions stored in a tangible, non-transitory, computer-readable medium, such as the one or more memory devices 34, using a processor, such as the one or more processors 32.

As illustrated, the controller 30 receives (block 52) a first set of images from the image capture device 18 of the vehicle 10 (e.g., obtained over a range of time). For example, the first set of images may be a continuous set of images or frames (e.g., from a video capture) of the interior of the vehicle 10. The first set of images may also be captured before a traffic incident has occurred.

The controller 30 identifies (block 54) one or more occupants in the first set of images. The one or more memory devices 34 may include software that enables the controller 30 to identify the one or more occupants in the first set of images based on, for example, image recognition techniques. For example, artificial intelligence may utilize imagery obtained from one or more perspectives to identify human forms (e.g., body shapes, features, faces) based on machine learning algorithms.

The controller 30 identifies (block 56) multiple biomechanical points of each occupant of the one or more occupants identified in the first set of images. The biomechanical points may include eyes, shoulders, elbows, sternum, hips, knees, and/or center of mass, of the one or more occupants. The one or more memory devices 34 may include software that enables the controller 30 to identify the multiple biomechanical points of each occupant of the one or more occupants in the first set of images based on, for example, image recognition techniques. Such techniques may employ different points of view (e.g., stereo-imagery).

The controller 30 performs (block 58) a first analysis of movement of the multiple biomechanical points of each occupant of the one or more occupants identified in the first set of images. In particular, the controller 30 may, for each occupant, perform the first analysis by determining, mapping, and/or recognizing movement of each biomechanical point to one or more other biomechanical points from a previous image to a next image for multiple images of the first set of images. In some embodiments, each biomechanical point may be tracked in three dimensional space for each occupant. The first analysis may include determining or calculating distance difference, speed, acceleration, and/or force between biomechanical points from a previous image to a next image. This may provide control cases for biomechanical movement for each occupant of the one or more occupants in the vehicle 10. In some embodiments, the controller 30 may repeatedly, continuously, periodically, or occasionally perform more analyses of movement during operation of the vehicle 10. The first analysis may be useful in determining the likelihood and/or the severity of injury to the one or more occupants of the vehicle 10.

The controller 30 receives (block 60) an indication that a traffic incident has occurred (e.g., in a range of time). The indication may be received via any suitable source. For example, the indication may be sent from the one or more sensors 38 of the vehicle 10, such as an airbag deployment sensor, a crash indication sensor, a bumper proximity sensor, and the like. In some embodiments, the one or more memory device 34 may include software configured to recognize that a traffic incident occurred based on analyzing images captured by the image capture device 18. Indeed, the indication may also be based on detected movement of vehicle occupants. In other embodiments, the indication may be communicated to the controller 30 via the communication interface 36 from an external source or vehicle component (e.g., sent by an emergency service or vehicle monitoring service).

The controller 30 receives (block 62) a second set of images (e.g., obtained over a range of time) from the image capture device 18 corresponding to when the traffic incident occurred. The controller 30 then identifies (block 64) the one or more occupants in the second set of images and identifies (block 66) the multiple biomechanical points of each occupant of the one or more occupants in the second set of images.

The controller 30 performs (block 68) a second analysis of movement of the multiple biomechanical points of each occupant in the second set of images. Again, the controller 30 may, for each occupant, perform the second analysis by determining, mapping, and/or recognizing movement of each biomechanical point to one or more other biomechanical points from a previous image to a next image for multiple images of the second set of images. The second analysis may include determining or calculating a total distance difference, speed, acceleration, and/or force between biomechanical points from a previous image to a next image. The second analysis may be useful in determining the likelihood and/or the severity of injury to the one or more occupants of the vehicle 10.

The controller 30 receives (block 70) vehicle movement information from the one or more sensors 38 corresponding to when the traffic incident occurred. In particular, the vehicle movement information may be related to the speed and/or acceleration of the vehicle 10 when the traffic incident occurred. The vehicle movement information may be useful in determining the likelihood and/or the severity of injury to the one or more occupants of the vehicle 10.

The controller 30 determines (block 72) the likelihood and/or the severity of injury to each occupant of the one or more occupants of the vehicle 10 based at least in part on the first analysis, the second analysis, and/or the vehicle movement information. In particular, the one or more memory devices 34 may include software and/or algorithms for determining the force that each occupant and each occupant's biomechanical points were subjected to based on inputs related to the first analysis, the second analysis, and/or the vehicle movement information. In some embodiments, the controller 30 may be able to confirm or refine the determination of the likelihood and/or the severity of injury to each occupant by analyzing a third set of images from the image capture device 18 corresponding to immediately after the traffic incident occurred. Present embodiments may also capture and analyze imagery associated with vehicle contents (e.g., loose objects in the vehicle 10) and features (e.g., seats) to determine a likelihood and/or severity of injury to occupants and/or the vehicle 10.

The controller 30 reports or sends (block 74) an alert or an instruction to alert an emergency service and/or an insurance company based at least in part on the determined likelihood and/or the severity of injury to each occupant of the one or more occupants of the vehicle 10. In some embodiments, additional or alternative entities may be alerted based at least in part on the determined likelihood and/or the severity of injury, such as law enforcement agencies, fire departments, hospitals, and the like. For example, the controller 30 may transmit images (e.g., at least a previous image and a next image) associated with the traffic incident, estimates of biomechanical forces for the one or more occupants, and/or the likelihood and/or severity of injury for the one or more occupants to a central server of a law enforcement agency, fire department, hospital, and the like. In this manner, life-saving assistance and insurance-related services may be provided to those affected by traffic incidents more quickly and efficiently in an automated fashion.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A data acquisition system for use in a vehicle comprising:
   an image capture device;
   a communication interface; and
   a controller communicatively coupled to the image capture device and communicatively coupled to the communication interface, wherein the controller comprises one or more processors configured to:
      receive a first plurality of images from the image capture device;
      identify a plurality of biomechanical points of one or more occupants in the vehicle in the first plurality of images;
      perform a first analysis of movement of the plurality of the biomechanical points of the one or more occupants in the first plurality of images by determining movement between the plurality of biomechanical points of the one or more occupants in a first image of the first plurality of images and the plurality of biomechanical points of the one or more occupants in a second image of the first plurality of images;
      receive an indication that a traffic incident has occurred;
      receive a second plurality of images from the image capture device corresponding to when the traffic incident occurred;
      identify the plurality of biomechanical points of the one or more occupants in the vehicle in the second plurality of images;
      perform a second analysis of movement of the plurality of the biomechanical points of the one or more occupants in the second plurality of images by determining movement between the plurality of biomechanical points of the one or more occupants in a first image of the second plurality of images and the plurality of biomechanical points of the one or more occupants in a second image of the second plurality of images;
      determine a likelihood of injury, a severity of injury, or a combination thereof, to the one or more occupants based at least in part on the first analysis of movement and the second analysis of movement; and
      send an alert, via the communication interface, based at least in part on the likelihood or the severity of injury to the one or more occupants.

2. The data acquisition system of claim 1, comprising one or more vehicle sensors, wherein the controller is communicatively coupled to the one or more vehicle sensors, wherein the controller is configured to receive vehicle movement information from the one or more vehicle sensors corresponding to when the traffic incident occurred.

3. The data acquisition system of claim 2, wherein the one or more processors are configured to determine the likelihood of injury, the severity of injury, or a combination thereof, to the one or more occupants based at least in part on the first analysis of movement, the second analysis of movement, and the vehicle movement information.

4. The data acquisition system of claim 2, wherein the controller is communicatively coupled to the one or more vehicle sensors via the communication interface.

5. The data acquisition system of claim 1, wherein the image capture device comprises the controller.

6. The data acquisition system of claim 1, wherein a mobile electronic device of an occupant of the one or more occupants of the vehicle comprises the controller.

7. A method comprising:
   receiving, via one or more processors, a first plurality of images from an image capture device of a vehicle;
   performing, via the one or more processors, a first analysis of movement of a plurality of biomechanical points of one or more occupants of the vehicle in the first plurality of images by determining movement of the plurality of biomechanical points of the one or more occupants between a first image of the first plurality of images and a second image of the first plurality of images;

receiving, via the one or more processors, an indication that a traffic incident has occurred;

receiving, via the one or more processors, a second plurality of images from the image capture device corresponding to when the traffic incident occurred;

performing, via the one or more processors, a second analysis of movement of the plurality of the biomechanical points of the one or more occupants in the second plurality of images by determining movement of the plurality of biomechanical points of the one or more occupants between a first image of the second plurality of images and a second image of the second plurality of images; and determining and reporting, via the one or more processors, a likelihood of injury, a severity of injury, or a combination thereof, to the one or more occupants based at least in part on the first analysis of movement and the second analysis of movement.

8. The method of claim 7, comprising receiving, via the one or more processors, a third plurality of images from the image capture device corresponding to after the traffic incident occurred.

9. The method of claim 8, comprising performing, via the one or more processors, a third analysis of movement of the plurality of the biomechanical points of the one or more occupants in the third plurality of images.

10. The method of claim 9, comprising refining or confirming, via the one or more processors, the likelihood of injury, the severity of injury, or a combination thereof, to the one or more occupants based at least in part on the third analysis of movement.

11. The method of claim 7, comprising:
identifying, via the one or more processors, the one or more occupants in the first plurality of images; and
identifying, via the one or more processors, the one or more occupants in the second plurality of images.

12. The method of claim 7, comprising:
identifying, via the one or more processors, the plurality of biomechanical points of the one or more occupants in the first plurality of images; and
identifying, via the one or more processors, the plurality of biomechanical points of the one or more occupants in the second plurality of images.

13. The method of claim 7, comprising sending, via the one or more processors, an instruction to alert an emergency service, an insurance company, a law enforcement agency, or any combination thereof, via a communication interface, based at least in part on the likelihood or the severity of injury to the one or more occupants.

14. The method of claim 8, wherein the third plurality of images comprises captured imagery of vehicle contents or features, wherein the method comprises analyzing, via the one or more processors, the captured imagery of vehicle contents or features, and determining the likelihood of injury, the severity of injury, or the combination thereof, based at least in part on analyzing the captured imagery of vehicle contents or features.

15. The method of claim 7, wherein:
the first analysis of movement comprises determining or calculating distance difference, speed, acceleration, force, or a combination thereof, between the plurality of biomechanical points of the one or more occupants in the first image of the first plurality of images and the plurality of biomechanical points of the one or more occupants in the second image of the first plurality of images, or the second analysis of movement comprises determining or calculating distance difference, speed, acceleration, force, or a combination thereof, between the plurality of biomechanical points of the one or more occupants in the first image of the second plurality of images to the plurality of biomechanical points of the one or more occupants in the second image of the second plurality of images.

16. One or more tangible, non-transitory, machine-readable media comprising instructions configured to cause one or more processors to:

perform a first analysis of movement of a plurality of biomechanical points of one or more occupants of a vehicle in a first plurality of images by recognizing movement of the plurality of biomechanical points of the one or more occupants between a first image of the first plurality of images and a second image of the first plurality of images;

perform a second analysis of movement of the plurality of the biomechanical points of the one or more occupants in a second plurality of images by recognizing movement of the plurality of biomechanical points of the one or more occupants between a first image of the second plurality of images and a second image of the second plurality of images;

determine a likelihood of injury, a severity of injury, or a combination thereof, to the one or more occupants based at least in part on the first analysis of movement and the second analysis of movement; and send an instruction to alert an emergency service, an insurance company, a law enforcement agency, or any combination thereof, via a communication interface, based at least in part on the likelihood or the severity of injury to the one or more occupants.

17. The one or more machine-readable media of claim 16, comprising instructions configured to cause the one or more processors to:
identify the one or more occupants in the first plurality of images; and
identify the one or more occupants in the second plurality of images;
identify the plurality of biomechanical points of the one or more occupants in the first plurality of images; and
identify the plurality of biomechanical points of the one or more occupants in the second plurality of images.

18. The one or more machine-readable media of claim 16, comprising an instruction configured to cause the one or more processors to receive vehicle movement information from one or more vehicle sensors corresponding to when a traffic incident occurred.

19. The one or more machine-readable media of claim 18, comprising an instruction configured to cause the one or more processors to determine the likelihood of injury, the severity of injury, or a combination thereof, to the one or more occupants based at least in part on the first analysis of movement, the second analysis of movement, and the vehicle movement information.

20. The one or more machine-readable media of claim 16, comprising an instruction configured to cause the one or more processors to receive an indication that a traffic incident has occurred from a vehicle sensor.

* * * * *